Dec. 12, 1933.                R. P. HEUER                1,939,211
                       REFRACTORY BRICK AND METHOD
                          Filed March 26, 1932
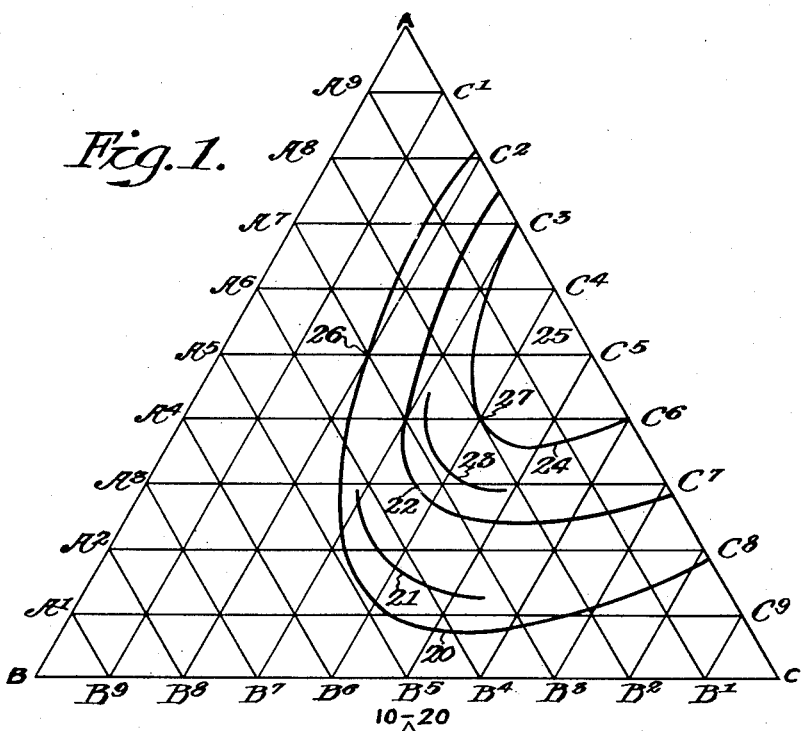
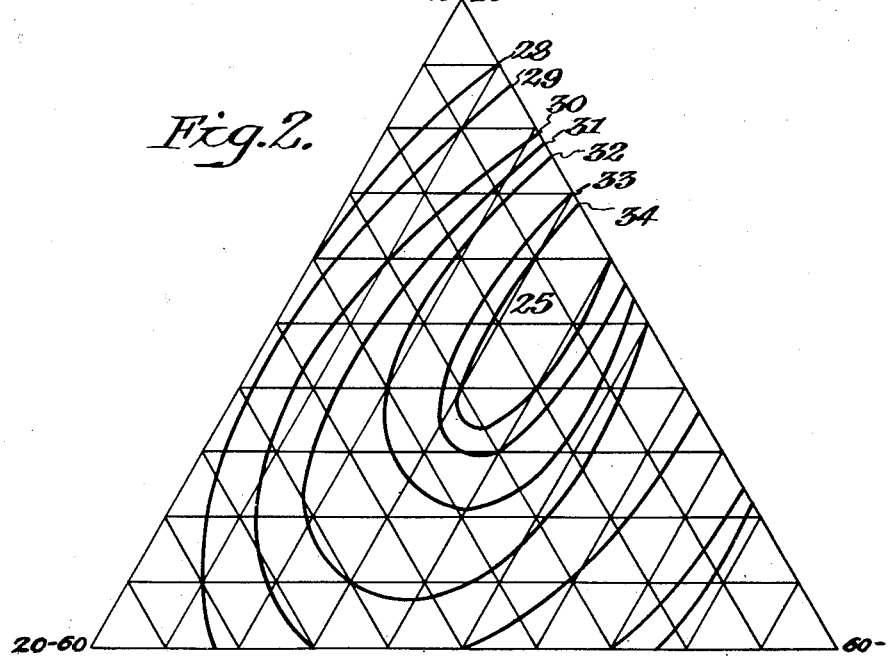

Patented Dec. 12, 1933

1,939,211

UNITED STATES PATENT OFFICE 1,939,211

REFRACTORY BRICK AND METHOD

Russell Pearce Heuer, Bryn Mawr, Pa., assignor to General Refractories Company, a corporation of Pennsylvania Application March 26, 1932. Serial No. 601,384

8 Claims. (Cl. 25—156)

My invention relates to refractory brick made chiefly from flint clay, and to methods of making the same.

The present invention is to a considerable extent a continuation of my application, Serial No. 519,591, filed March 2, 1931, for "Refractory brick and method" which has become Patent 1,886,185.

A purpose of my invention is to produce flint clay refractory brick which possess improved volume stability when heated to high temperature under static loads.

A further purpose is to make flint clay brick, possessing improved volume stability at high temperatures, by incorporating in the raw brick mix high percentages of flint clay which has previously been reduced to a volume stable condition by calcining raw flint clay.

A further purpose is to make refractory brick, using higher percentages of volume stable flint clay, in a way calculated to develop maximum interfitting and proper surface contact of the ground particles which compose the formed brick, by controlling the grain sizes of the ground particles and forming the brick under high pressure.

A further purpose is to make brick largely of calcined flint clay, adding only enough raw clay to coat the calcined particles, without forming a substantial body of raw clay between the calcined particles, which would make the brick less refractory as well as less dense.

A further purpose is to combine graded sizes of calcined flint clay particles in proper proportions to produce a mix of maximum density.

A further purpose is to apply, to a mix comprising calcined flint clay particles and less than 25% of raw clay particles, pressure exceeding 1,000 pounds per square inch (70.3 kilograms per square centimeter).

A further purpose is to bond an unfired brick comprising chiefly calcined flint clay by a temporary or permanent bonding agent other than plastic clay.

Further purposes appear in the specification and in the claims.

My invention relates both to the methods involved and to the articles produced by the methods.

In the drawing, Figures 1 and 2 are ternary diagrams for three graded size bands consisting chiefly of flint clay particles.

Flint clay is an extremely important raw material for making refractory brick. It is one of the family of hydrous alumina-silica minerals, including such other minerals as bauxite, diaspore (these are alumina-silica minerals because they contain very substantial quantities of silica as an impurity), diasporitic clays, kaolin, bauxitic kaolin and plastic or bonding clays. Flint clay is distinguishable in its behavior from the other hydrous alumina-silica minerals, as will be later pointed out.

Raw flint clay is by nature non-plastic, but it is, however, hydrous, and presents some difficulty in firing after forming into brick. Raw flint clay, if it be moistened, formed into brick, dried and placed in a kiln for firing, undergoes several changes during firing. As an example I will consider the behavior of a raw flint clay of composition $Al_2O_3.2SiO_2.2H_2O$, neglecting for the moment the silica impurities present in flint clay.

In spite of the drying operation, some mechanically mixed moisture still remains. As the brick first becomes heated, this is driven off. During further heating, between 400 and 600° C., the chemically combined water, in this instance two molecules, is eliminated. The remaining clay at high temperatures forms mullite $3Al_2O_3.2SiO_2$.

At high temperatures mullite crystals grow, producing a very desirable structure of long interlacing crystals. In ordinary firing practice, however, the temperature does not rise high enough to produce interlacing mullite crystals, and the mullite is finely divided and correspondingly weak.

Any excess of silica, which does not form mullite due to lack of alumina, is changed to crystobalite as the burning temperature increases. The presence of crystobalite is undesirable in many cases because crystobalite exhibits an abnormal thermal expansion at about 200° C., and is, therefore, likely to make the brick inferior.

At high temperatures the excess silica can be vitrified, destroying the crystobalite and producing a silica glass of the eutectic composition, 5% of alumina and 95% of silica. The alumina-silica eutectic is free from abnormal temperature expansion. The conversion of crystobalite into alumina-silica eutectic requires a temperature above 1400° C. for most flint clays.

Brick made of raw flint clay cannot be heated to the high temperature required to vitrify the silica and produce the eutectic because of distortion of the brick and because of the undesirably hard and overburned structure resulting. As a consequence, such brick after firing consist of mullite in a finely divided state and crystobalite, rather than interlaced mullite crystals and alumina-silica eutectic.

Brick made from raw flint clay are defective because of the numerous changes which the ingredients of the brick undergo during firing, such as the elimination of water of composition, formation of mullite, conversion of silica to crystobalite, etc., each with its peculiar volume changes and alterations in the surfaces of contact of the constituent particles.

Recognizing the deficiencies of raw flint clay, efforts have been made in the past to form bricks from a mix consisting of raw clay and calcined flint clay, the raw clay being mixed with the calcined flint clay to bond the brick, since the calcined flint clay is non-plastic. To the extent of its presence, raw clay adds its inherent undesirable features previously noted, especially shrinkage. Nevertheless, a considerable body of raw clay is supposed to be necessary for the sake of bonding.

As an example of prior practice, I will refer to the well known procedure in making fire clay brick. A typical mix consists of 70% of raw flint clay, 20% of raw plastic clay and 10% of calcined clay or "grog." As much raw flint clay is used as possible, while the amount of plastic clay is maintained at a minimum since it is the least refractory of all of the ingredients. Brick containing an excess of plastic clay over that needed to bond the other ingredients are inferior because of excessive shrinkage of the plastic clay and because of burning of the plastic clay to a dense mass which spalls readily.

The mix is normally passed through a screen having between 3 mesh per linear inch (1.4 mesh per square centimeter) and 10 mesh per linear inch (15.5 mesh per square centimeter). Frequently the plastic clay is ground separately from the flint clay and to a greater extent, so that, for example, it will pass through a screen having 16 mesh per linear inch (39.7 mesh per square centimeter) or even 50 mesh per linear inch (387.5 mesh per square centimeter). The grog may be ground with either the flint clay or the plastic clay.

The mix is moistened with water and formed into brick by hand or machine. For hand forming, sufficient water, as for example 14%, is used to develop the full plasticity of the clay. In the stiff mud process of machine forming, the clay is moistened with about 10% of water, extruded from an auger machine and formed under a press usually exerting less than 500 pounds per sqare inch (35.2 kilograms per square centimeter) pressure. In the dry press process about 7% of water is added, so that the clay, while not fully plastic, is in the condition of a moist foundry sand. The press pressures used are usually less than 1,000 pounds per square inch (70.3 kilograms per square centimeter).

After forming, the brick are dried to remove most of the water, and then fired up to temperatures of 1,250 to 1,450° C.

Although brick made by the process just described, and containing 10% of calcined flint clay, are satisfactory for some purposes, they are lacking in volume stability and rigidity at high temperatures.

In my copending application, Serial No. 519,591, I have described and claimed brick of desirable volume stability and rigidity made from hydrous alumina-silica minerals, a large proportion of which are reduced to a volume stable condition before forming. As described in my copending application, the brick mix is unnaturally low in raw anhydrous alumina-silica mineral, preferably containing less than 20%, or even being free from the raw hydrous mineral altogether.

While the use of a brick mix consisting chiefly of volume stable particles is desirable in the case of the alumina-silica minerals generally, as explained in my copending application, my invention has especial utility when applied to flint clay, due to the peculiarities of flint clay and to the differences between flint clay and the other alumina-silica minerals.

Flint clay consists chiefly of the compound $Al_2O_3.2SiO_2.2H_2O$, along with appreciable quantities of silica impurity. It is non-plastic in the raw condition, and therefore has a relatively low content of colloidally combined water. Furthermore, due to its geological history, raw flint clay is of relatively low porosity, and, accordingly, contains little water in the pore spaces. It has a close and dense structure which does not readily absorb water.

On the other hand, the other hydrous alumina-silica minerals normally contain large amounts of water. For example, kaolin and the plastic bonding clays contain considerable quantities of water, chemically combined, colloidally combined, filling the pore spaces and adhering.

It is therefore evident that the tendency of flint clay to shrink on subjecting it to firing temperature is much less than the corresponding tendency in highly plastic materials such as kaolin and plastic bonding clay. It may be roughly stated that the tendency to shrink at firing temperature is only about half as great in flint clay as in kaolin, for example.

There is a further factor which would appear to be of importance in connection with the shrinking of flint clay. Due to the silica present as an impurity, flint clay ordinarily contains a substantial excess of silica over that indicated by the formula $Al_2O_3.2SiO_2.2H_2O$. Since all of the alumina is used up by a small part of the silica in forming mullite, $3Al_2O_3.2SiO_2$, the excess silica (present as quartz) cannot form mullite, and therefore must produce a less dense form of silica, such as crystobalite or alumina-silica eutectic. The growth of the silica to one of these less dense forms therefore partially compensates for the tendency of the flint clay to shrink.

In a material like kaolin, however, which usually conforms quite closely to the formula $Al_2O_3.2SiO_2.2H_2O$, the excess of silica over that required to form mullite is less pronounced, and therefore the growth of the excess silica is less effective in compensating for the tendency of kaolin to shrink. In the minerals having a still higher ratio of alumina to silica, such as bauxite, diaspore, diasporic clays, and bauxitic kaolin, the compensating effect on the shrinkage, due to growth of the excess silica, either does not exist at all or is a decreasing factor.

Thus, among the alumina-silica minerals, flint clay exhibits the most powerful effect of compensation of shrinkage by growth, and, at the same time, suffers least from shrinkage, because of its initial dense formation and low plasticity.

The high percentage of alumina in such minerals as bauxite and diaspore causes these minerals to contain large percentages of mullite after calcining. To a less but appreciable extent this is also true of kaolin. On the other hand, due to the considerable percentages of excess silica in calcined flint clay, many of its characteristics are attributable to this silica rather than to mullite.

Where a mineral is highly shrinkable, like kaolin, the difficulty of bringing it to a volume stable condition by calcining it is much increased because, in general, the greater the shrinkage which is to take place, the less complete will be the shrinkage at a given calcining temperature, so that a higher temperature must be used; the greater will be the time required for shrinkage; and, in spite of all precautions, the greater will be the percentage of voids after shrinkage, unless the mineral be actually melted. All of these factors indicate that the expense of reducing a highly shrinkable mineral, like kaolin, to a volume stable condition is much greater, and the ultimate results less satisfactory, than with a mineral of limited shrinkability, like flint clay.

In order to take advantage of the use of calcined flint clay, I form at least 75%, and preferably at least 85% of the brick mix of flint clay which has been reduced to a suitable volume stable condition.

Ordinary grog or ground brick bats are not suitable for this purpose. My calcine must be very dense and must contain not more than 5% of open pore space. Here, as in other cases in which I refer to open pore space, I mean open pore space as tested by immersing in water under reduced pressure.

I prepare this dense calcine by heating raw flint clay to a suitable high temperature and maintaining the temperature for a time sufficient to permit the viscous silica glass to consolidate the mass to 5% or less of open pore space.

The same calcining temperature is not required for all flint clays. With some, as for example Pennsylvania flint clay, it is necessary to go above the temperature of the eutectic of the alumina-silica series (1545° C.).

For flint clays which contain fluxes such as soda, potash, lime, magnesia, iron oxide, etc., the calcining temperature need not be as high as the eutectic. I may accordingly reduce the calcining temperature so long as I produce a calcine of 5% open pore space or less. For example, Kentucky and Missouri flint clays may satisfactorily be calcined at a temperature of 1400° C.

Whatever the raw material, I adjust the temperature and time of treating to obtain a calcined particle porosity of less than 5%, since I find it difficult to produce volume stable brick of the quality which I desire if the calcine is more porous than the above figure.

By calcining at the high temperatures which I employ, I obtain long interlacing mullite crystals which add strength to the product. The excess of silica, instead of being converted to cristobalite, is changed to the alumina-silica eutectic, which exhibits no abnormal thermal expansion.

I find that plastic or bonding clay need not be used at all. And even where plastic or bonding clay is to be used, I find that the percentages required are much less than those which in the past have been considered minimal. I have discovered that the use of more than 25% of raw clay with calcined flint clay in a brick mix, instead of being necessary, is positively harmful, and that superior results are obtained if the raw clay be kept below 20%, or better below 15%.

Even though it lack plasticity, the calcined flint clay can be bonded without any plastic or other mineral bond to produce brick exceeding in cold crushing strength those made from raw flint clay.

The formation of brick from calcined flint clay particles is greatly assisted by grading the sizes of the particles which are to go into the brick and by combining the graded sizes in proportions determined in studies made by me. Grading and combining of sizes reduce the need for bonding, and this is very important where, as in my brick, raw clay is eliminated or maintained as low as 25%.

While the grading of sizes and the combining of size bands is advantageous even when applied to flint clay brick containing more than 25% of raw clay, part of the advantage is lost in that case by shrinkage of the raw particles during firing or during heating in use. Where, however, the grading of sizes and combining of size bands are applied to brick containing at least 75% and preferably 100% of calcined flint clay, the full advantage of grading and combining is obtainable for the first time in flint clay brick, because none of the interfitting due to grading and combining is damaged by shrinkage and because the particles themselves are very dense.

In the drawing I illustrate ternary diagrams showing the effects of various size bands upon the density of flint clay brick.

Considering the generic diagram shown in Figure 1, various mixes of three different consecutive size zones or bands of graded particles of flint clay minerals are shown, mixed together in different proportions. I have discovered that the density of the mix is dependent upon the relative quantities of the different sizes from which the mix is made. The curves are contour curves, as it were, showing loci of equal density of brick plotted upon the ternary diagram and indicating the effect of various relative quantities of the different zones or bands of graded sizes of flint clay particles.

I have found that the best interfitting possible is by eliminating an intermediate size of particles.

The three components A, B and C as indicated in Figure 1, consist respectively of consecutive size bands used in my tests. While in each test I have used particular size bands, my invention in its broadest aspects is independent of the size bands which are used.

The component A is made up of particles which pass through a screen which excludes particles too large for desirable use in a brick and rest upon a screen of mesh size "$a$". The component B is made up of particles that are small enough to pass through a screen "$a$" and are large enough to rest upon a screen "$b$". The component C comprises those sizes which will pass through a screen "$b$".

In the diagram the proportion of the component A is indicated by the perpendicular distance of any point in question from the line BC, and, for convenience, the lines $A'$, $A^2$, $A^3$, $A^4$, $A^5$, $A^6$, $A^7$, $A^8$ and $A^9$ have been drawn parallel with the line BC to indicate percentages of component A from 10% to 90%. Correspondingly, the percentages of the component B are represented by the perpendicular distance from the line AC and for convenience in illustration, the lines $B'$ to $B^9$ have been drawn parallel to the line AC to show percentages of the component B from 10% to 90%. In the same manner, the perpendicular distance from the line AB represents percentages of the component C, and the lines $C'$ to $C^9$ indicate percentages of the component C from 10% to 90%.

At any point within the diagram the sum of the components A, B and C will equal 100%.

According to the above explanation and as a result of tests, isodensity curves 20, 21, 22, 23 and 24 have been drawn, each of which is the loci of mixtures of the different components A, B and C, which have the same density. The curves are numbered beginning with that of lowest density and proceeding to that of highest density.

It will also appear that for curves of lower density, such as 20, the variety of different mixtures is much greater than for curves of higher density, such as 24. Brick mixes of proportions indicated by location in the area 25 between the curve 24 and the line AC are of very high density.

In order that the use of the curves may be clear, I will first give applications upon the generic curve shown in Figure 1. For example, a refractory mix designated by location at the point 26 on curve 20 will contain 50% of component A, 30% of component B and 20% of component C, while a refractory located at a point 27 on curve 24 will have 40% of A, 20% of B and 40% of C.

Though the diagram of Figure 1 gives a good idea of the general principles applicable to all flint clay mixes, I have included another diagram for specific sizes, illustrating the similarity of the specific curve to the generic curve.

In Figure 2 the material used is flint clay reduced to a volume stable condition in the manner explained. The larger or A particles are such as pass through a screen having 10 mesh per linear inch (15.5 mesh per square centimeter) and rest upon a screen having 20 mesh per linear inch (62.0 mesh per square centimeter) and the intermediate or B band of particles pass through a screen having 20 mesh per linear inch (62.0 mesh per square centimeter) and rest upon a screen having 60 mesh per linear inch (558.0 mesh per square centimeter). The C particles are those which pass through a screen having 60 mesh per linear inch (558.0 mesh per square centimeter).

The isodensity curves 28 to 34 inclusive respectively show equal density calcined flint clay mixes of progressively greater density. It will be noted that as the percentage of B particles decreases the density of the mixture increases. While the area 25 has a somewhat different shape in Figure 2 from that of Figure 1, its location is generally the same as in Figure 1.

Inspection of the specific example of Figure 2 indicates that the proper proportions and the limits of the size bands may vary slightly in individual cases without altering the principles involved, since in any case the mix of maximum density has about the same percentages of A and C particles, with abnormally low amounts of B particles.

The location of the area of maximum density is substantially the same for all flint clays. The general law here disclosed holds for materials which are non-plastic or substantially so, but does not apply to plastic materials, which do not follow the rules here explained. I find that the law applies to the mixes of calcined flint clay and plastic clay provided the amount of plastic clay does not exceed 25%.

The A particles should preferably range between 10 and 20 mesh per linear inch (15.5 and 62.0 mesh per square centimeter), although a range between 3 and 30 mesh per linear inch (1.4 and 139.5 mesh per square centimeter) is not undesirable. The fine particles should pass through a screen having 60 or 80 mesh per linear inch (558.0 or 992.0 mesh per square centimeter) or finer to get the best results. Fine grinding is expensive, however, and I find that the size of the fine screen may be 50 mesh per linear inch (387.5 mesh per square centimeter) without seriously affecting the quality of the brick.

It is evident that the densest brick is formed from a mix having proportions indicated by location in the area 25 between a curve of high density and the zero line for B particles. The mix which I preferably use consists of approximately 55% of A particles and approximately 45% of C particles without substantial quantities of B particles. I may, however, employ between 70 and 30% of A particles and between 30 and 70% of C particles. It will be understood that advantage may be obtained from my invention without necessarily eliminating the B particles, provided they be maintained unnaturally low.

In this application I do not intend to claim broadly the use of particles graded according to the principles shown upon the ternary diagrams, but I wish to claim the features of grading which especially cooperate with the use of between 75 and 100% of calcined flint clay particles to produce a dense brick.

I much prefer high pressures for the pressing operation, since they more fully interfit the particles than is possible with lower pressures.

Prior to forming I moisten the mix, whether or not it consists of graded particles, with about 4% of water.

At the same time that the water is added, I may apply a temporary bonding agent. For this purpose about 1% of organic material, such as dextrin, tapioca flour, the tar-like residue from the sulphite paper process, etc., may be used.

A temporary bonding agent is desirable, but not essential, to increase the strength of the brick prior to firing, since the calcined flint clay has no plasticity. The temporary binder preferably entirely disappears in firing.

I find that, instead of a temporary binder, I may employ a permanent binder and dispense altogether with firing. The firing operation is then replaced by the heating to which the brick is subjected during use. By high pressure and graded particle sizes the percentage of voids is maintained low, and the resulting brick compares favorably with fired brick.

Sodium silicate is a satisfactory permanent binder. However, the amount of sodium silicate should be reduced to a minimum, as it makes the brick less refractory. The elimination of raw clay makes possible the use of less sodium silicate. When brick bonded with sodium silicate is to be used unfired, the amount of raw clay will preferably not exceed 5%, if indeed any raw clay be used. High forming pressure and graded particle sizes may decrease the demand for sodium silicate.

Well bonded brick can be made using as little as 2% of sodium silicate. This quantity does not appreciably injure the refractory properties of the brick. Furthermore, the particles have volumetric stability, since the voids in the particles are reduced to 5% or less. The expense of firing is saved.

In my invention I preferably use considerably higher forming pressures than in the prior art. I find it advantageous to subject the moistened mix to pressures exceeding 1000 pounds per square inch (70.3 kilograms per square centimeter), to give to the brick the very intimate particle interfitting conducive to strength. I preferably use graded particle sizes combined in the proportions indicated above and I prefer to increase the pressure to 5000 pounds per square inch (351.5 kilograms per square centimeter) and in some instances to 10,000 pounds per square inch (70.3 kilograms per square centimeter).

If the proper particle interfitting is obtained during the forming operation, and if the particles be preliminarily calcined so that shrinking will not destroy the interfitting during firing, I find that I may obtain very high volume stability and rigidity at high temperature without special firing procedure.

The pressed brick are of course dried before firing. The firing temperatures need not exceed 1400° C.

Burned flint clay brick of size 9x4.5x2.5 inches (22.9x11.4x6.3 centimeters) prepared according to my invention exhibit a cold crushing strength on the 4.5x2.5 inch (11.4x6.3 centimeter) face as high as 6000 pounds per square inch (421.8 kilograms per square centimeter). Under similar testing conditions, hand made flint clay brick often do not sustain 1000 pounds per square inch (70.3 kilograms per square centimeter) pressure, while machine made flint clay brick usually fall below 3000 pounds per square inch (210.9 kilograms per square centimeter) ultimate crushing strength.

Of course, where I use a permanent binder, I need not fire the brick, but I nevertheless gain advantage from the volumetric stability and close interfitting of the particles in increased cold crushing strength.

Likewise, my brick are very desirably refractory, sustaining crushing loads at high temperatures and strongly resisting spalling and slag penetration or attack. The low porosity of the brick is the property most closely associated with these desirable attributes. The decrease in the voids between particles is possible because of the volumetric stability of the particles, the grading and combining of particle sizes and the use of high pressure.

In making up the brick mix, I will use not more than 25% of raw clay, so that shrinkage of the raw clay will not seriously injure the interfitting of the particles, and so that there will not be formed, between the particles, a sufficient body of raw clay to greatly reduce the refractory quality of the brick. Where the raw clay used is flint clay, its presence is less disadvantageous than where it is plastic or bonding clay. Therefore, if plastic or bonding clay be added it is more desirable to restrict the content of raw clay below 25% (the maximum) than if flint clay be the raw ingredient.

I recognize that grog has been generally used in the past in clay brick and that attempts have been made to incorporate large amounts of it in a mix for special purposes. Grog of the highly porous variety can be so applied, but the brick produced are weak and the porous grog tends to shrink when such brick are put into use.

Decreasing the porosity of the grog to overcome the shrinkage has made the brick still weaker with the result that the cure is worse than the disease. I find that by properly grading the sizes, and pressing the grog particles to obtain maximum interfitting and close surface contact, a very desirable bond, not heretofore obtainable in mixes low in raw clay, can be produced. This bond is stronger with non-porous particles than with porous particles. Hence, I am able to obtain strength not previously obtained in ordinary high grog brick, as well as volume stability under high temperatures not heretofore obtained.

I believe that I am the first to make brick of desirable rigidity when hot from flint clay using a mix comprising particles of volume stable calcine of 5% or less of open pore space and 25% or less of raw clay.

I also believe that I am the first to grade and combine the sizes of particles of a mix comprising 75% (better 85%) or more of volume stable calcined flint clay.

I believe that it is new to apply pressures in excess of 1000 pounds per square inch (70.3 kilograms per square centimeter) to brick mixes containing at least 75% of calcined flint clay particles.

I further believe that I am the first to add temporary or permanent bonding agents to mixes comprising 75% or more of calcined flint clay.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of making refractory brick from flint clay, which consists in calcining flint clay until its open pore space is reduced to 5% or less and subsequently forming a mix containing at least 75% calcined flint clay into brick under pressure exceeding 1000 pounds per square inch.

2. The method of making refractory brick from flint clay, which consists in calcining flint clay until its open pore space is reduced to 5% or less, in subsequently mixing, with the calcined flint clay, raw clay to the extent of less than 25% of the total, and in forming the mix into brick under pressure exceeding 1000 pounds per square inch.

3. The method of making refractory brick from flint clay, which consists in calcining flint clay at a temperature above 1400° C. and in subsequently forming a mix containing at least 75% calcined flint clay into brick under pressure exceeding 1000 pounds per square inch.

4. The method of making refractory brick from flint clay, which consists in calcining flint clay at a temperature above 1400° C., in subsequently mixing, with the calcined flint clay, raw clay to the extent of less than 25% of the total, and in forming the mix into brick under pressure exceeding 1000 pounds per square inch.

5. The method of making refractory brick from flint clay, which consists in calcining flint clay until its open pore space is reduced to 5% or less, in mixing, with particles of calcined flint clay, particles of raw clay to the extent of less than 25% of the total, in adding sodium silicate to the mix, in forming the mix into brick under pressure exceeding 1000 pounds per square inch and in heating the brick to firing temperature during use in a furnace lining.

6. The method of making refractory brick from flint clay, which consists in calcining flint clay until its open pore space is reduced to 5% or less, in mixing particles between 3 and 30 mesh and particles smaller than 50 mesh in proportions of from 30 to 70% of each, using sufficient calcined flint clay so that it comprises 75% of the total mix and in forming the mix into brick under pressure exceeding 1000 pounds per square inch.

7. A clay brick formed from a mixture containing more than 75% of calcined flint clay and having its particles tightly interfitted.

8. A clay brick formed from a mixture containing more than 75% of flint clay particles whose open pore space is 5% or less and having its particles tightly interfitting.

RUSSELL PEARCE HEUER.

CERTIFICATE OF CORRECTION.

Patent No. 1,939,211.                                                                            December 12, 1933.

RUSSELL PEARCE HEUER.

It is hereby certified that error appears in the printed specification of the above numbered patent requiring correction as follows: Page 2, line 66, for "anhydrous" read hydrous; and that the said Letters Patent should be read with this correction therein that the same may conform to the record of the case in the Patent Office.

Signed and sealed this 20th day of February, A. D. 1934.

(Seal)                                                    F. M. Hopkins
                                                         Acting Commissioner of Patents.